US007292545B2

(12) United States Patent
Maki et al.

(10) Patent No.: US 7,292,545 B2
(45) Date of Patent: Nov. 6, 2007

(54) WIRELESS LAN SYSTEM

(75) Inventors: Hideo Maki, Kawasaki (JP); Yoshikazu Kobayashi, Kawasaki (JP)

(73) Assignee: NEC Infrontia Corporation, Kanagawa (JP)

(*) Notice: Subject to any disclaimer, the term of this patent is extended or adjusted under 35 U.S.C. 154(b) by 594 days.

(21) Appl. No.: 10/720,101

(22) Filed: Nov. 25, 2003

(65) Prior Publication Data

US 2004/0105421 A1 Jun. 3, 2004

(30) Foreign Application Priority Data

Nov. 28, 2002 (JP) ............................ 2002-345651

(51) Int. Cl.
*G08C 17/00* (2006.01)

(52) U.S. Cl. ...................................... 370/311; 455/574

(58) Field of Classification Search ................ 370/277, 370/278, 280, 282, 294, 311, 313, 314, 328, 370/345–348; 455/574
See application file for complete search history.

(56) References Cited

U.S. PATENT DOCUMENTS 6,002,918 A * 12/1999 Heiman et al. ............ 340/7.38
6,018,642 A * 1/2000 Adachi ...................... 340/7.33
6,768,721 B1 * 7/2004 Schmitz et al. ............. 370/248
6,791,962 B2 * 9/2004 Wentink ..................... 370/338
6,915,142 B1 * 7/2005 Wietfeldt .................... 455/557
6,990,362 B2 * 1/2006 Simpson et al. ............ 455/574
7,230,933 B2 * 6/2007 Bahl et al. .................. 370/311
2003/0212531 A1 * 11/2003 Kerr et al. .................. 702/188
2004/0043797 A1 * 3/2004 Shostak ...................... 455/574
2004/0106441 A1 * 6/2004 Kazakevich et al. ........ 455/574
2004/0114535 A1 * 6/2004 Hoffmann et al. .......... 370/252

FOREIGN PATENT DOCUMENTS

JP 6-303242 10/1994
JP 2002-135203 5/2002
JP 2002-268778 9/2002

OTHER PUBLICATIONS

Matsushita et al., Bunsankyocho Media Series 7: *Wireless LAN Architecture*, Jun. 6, 1996, pp. 167-169, Kyodachi Publishing Co., Ltd., Japan.

* cited by examiner

*Primary Examiner*—Wellington Chin
*Assistant Examiner*—Ahmed Elallam
(74) *Attorney, Agent, or Firm*—Young & Thompson

(57) ABSTRACT

To provide a wireless LAN system, a sleep mode is set for reducing consumed power and, when an arrival of the own address side is present, wake-up is caused to reliably receive the arrival. Specifically, a plurality of hosts 20 such as PC interconnected with an access point 30 via a wireless LAN each include a wireless LAN device 21, the power supply thereof being turned on and off in synchronism to a beacon signal 32 sent out in a predetermined constant cycle from the access point 30 for checking whether any arrival of data addressed to the own host 20 is present. When any arrival 33 of data is present the host 20 starts an application for reception of the arrived data.

2 Claims, 4 Drawing Sheets

WIRELESS LAN DEVICE IS IN THE SLEEP STATE S1
WIRELESS LAN DEVICE POWER ON S2
INQUIRY TO THE ACCESS POINT S3
PRESENTS TO BE ADDRESSED TO THE OWN HOST ADDRESS S4
YES
NO
PROVIDES A START REQUEST TO THE HOST (PC,PDA) S5
STARTS THE APPLICATION S6
THE HOST IS IN A STATE OF COMMUNICATION S7
THE COMMUNICATION IS ENDED S8

WIRELESS LAN SYSTEM

BACKGROUND OF THE INVENTION

This application claims benefit of Japanese Patent Application No. 2002-345651 filed on Nov 28, 2002, the contents of which are incorporated by reference.

The present invention relates to wireless LAN (local area network) systems and, more particularly wireless LAN systems, in which such hosts as PC (personal computer) or PDA (personal digital assistant) or the like is interconnected for inter-host communication, such as reception of IP phone calls (i.e., made by transmitting voice signals in packets based on an internet protocol) and electronic mail.

It has been proposed to interconnect such hosts as PC and PDA via a wireless LAN instead of a wired communication line such as a telephone line. The use of the wireless LAN has various merits such that hosts are not installed in fixed places but can be freely moved to any desired place, if necessary, and also that the hosts can be interconnected without need of any wiring. In each of such hosts interconnected by the wireless LAN, a wireless LAN device is mounted.

In the meantime, the operation of the above host, however, dictates considerable power consumption. The total consumed power thus increases in proportion to the number of hosts. This consumed power can not be ignored, and in the case of a host which is driven by a built-in battery or the like high consumed power is undesired. As for the user side, the host is not always in use, and mails or the like are not always arrived.

The power supply of the host is usually held "off" while the user does not use the host or when the user has not used the host for a predetermined constant period of time to reduce the power consumed in the host. As a different prior art, a LAN circuit system or the like has been proposed, which causes, in a LAN, a mode shift to a sleep mode, in which a node is held in a passive state for a predetermined period of time, for consumed power reduction, and also causes wake-up upon detection of a signal transfer start signal from the network side in an edge detection circuit or the like (see Literature 1: Japanese Patent Laid-open Hei 6-303242).

A prior art as shown has a problem that by turning off the power supply of a host connected to an associated wireless LAN device the power supply thereof is also turned off. At this time, an arrival of an IP phone or a mail as noted above, if any, from another host could not be received. In other words, any arrived IP phone or mail could not be received unless the power supply of the wireless LAN device is turned on in the "on" state of the power supply of the host.

SUMMARY OF THE INVENTION

The present invention has made in view of the above problems inherent in the prior art, and it has an object of providing a wireless LAN system capable of reception of arrived IP phone or mail even in the "off" state of the power supply of the host.

According to an aspect of the present invention, there is provided a wireless LAN system comprising a plurality of hosts each having a wireless LAN device and capable of wireless communicating with an access point, wherein: even when a power supply of a host is "off", the associated wireless LAN device intermittently turns on its power supply in synchronism to a beacon signal from the access point to check the presence of any received arrival addressed to itself.

The beacon signal is sent out in a predetermined constant cycle of about 100 msec. Upon detection of an arrival packet addressed to itself the wireless LAN device starts the associated host to start an arrival reception application. The wireless LAN device is a LAN component including a PHS or like wireless communication means. The power supply of the PHS or like wireless communication means is held "on" at all times. The host is constituted by a PC (personal computer) or a PDA (personal digital assistant).

According to another aspect of the present invention, there is provided a wireless LAN system wherein a plurality of hosts are interconnected with an access point via a wireless LAN and each of hosts includes a wireless LAN device, power supply of the wireless LAN device is turned on and off in synchronism to a beacon signal sent out in a predetermined constant cycle from the access point for checking whether any arrival of data addressed to the own host is present, and when any arrival of data is present the host starts an application for reception of the arrived data.

Other objects and features will be clarified from the following description with reference to attached drawings.

PREFERRED EMBODIMENTS OF THE INVENTION

Preferred embodiments of the present invention will now be described with reference to the drawings.

Figure 1:
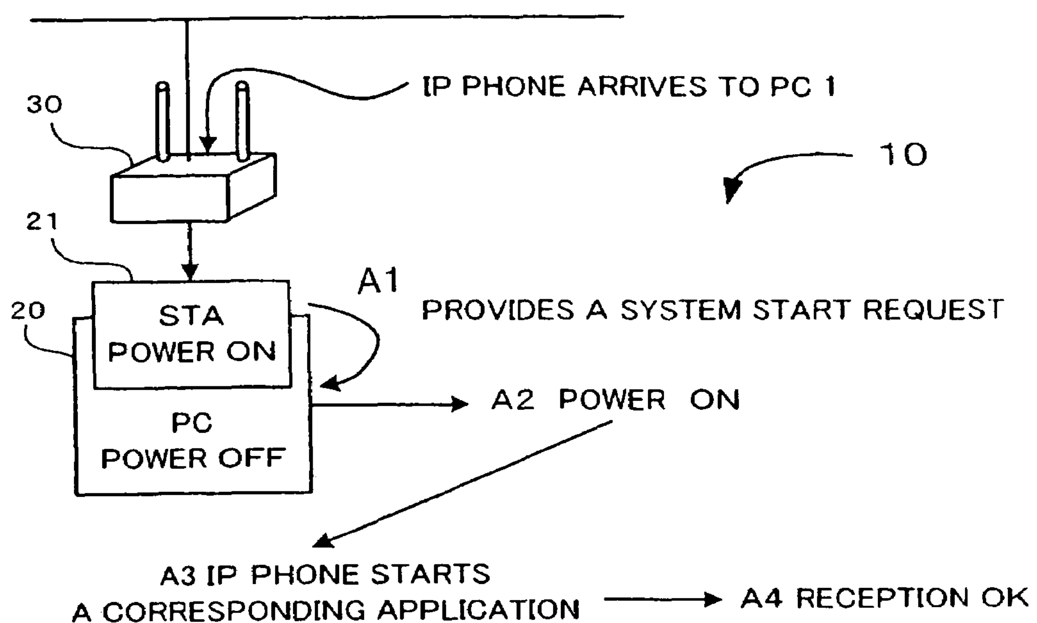
FIG. 1 is a view for describing the main part of a first embodiment of the wireless LAN system according to the present invention.

FIG. 1 is a view for describing the main part of a first embodiment of the wireless LAN system according to the present invention. The wireless LAN system 10 according to the present invention comprises a plurality of hosts (such as PCs) 20 (only one host being shown in FIG. 1). A wireless LAN device (STA) 21 is mounted in each host 20. The wireless LAN device 21 has a transmitting/receiving antenna (not shown), which can communicate with wireless LAN devices in other hosts via an access point (or wireless base station) 30.

As shown, in the wireless LAN system 10 according to the present invention, the wireless LAN device 21 is mounted in (or connected to) each host 20, and also has an application (i.e., software) permitting reception of arrived IP phone. In the normal state of the wireless LAN system 10, each wireless LAN device 21 is in a sleep state in an energy-saving mode. As will be described later, a beacon signal is sent out in a constant cycle from an access point. The wireless LAN device 21 has its power supply repeatedly turned on and off in the same cycle as the beacon signal to make inquiry to the access point about whether any arrived packet is present. When an arrived packet is received, the wireless LAN device 21 provides a system start request to the host 20 (step A1). When the host 20 is started, i.e., its power supply is turned on (step A2), it starts a corresponding application (step A3). As a result, the host 20 becomes ready for receiving any arrived packet (reception OK) (step A4). When no arrived packet is present, the sleep state is restored.

The wireless LAN device has a built-in power supply, and in the case of the "off" state of PC (personal computer) power supply it uses the built-in power supply to respond to the beacon signal from the access point. In the case of the "on" state of the PC power supply, the wireless LAN device 21 uses a PC power supply to respond to the beacon signal from the access point. At this time, a sleeping mode is set in the wireless LAN device 21 itself for consumed power reduction.

Figure 2:
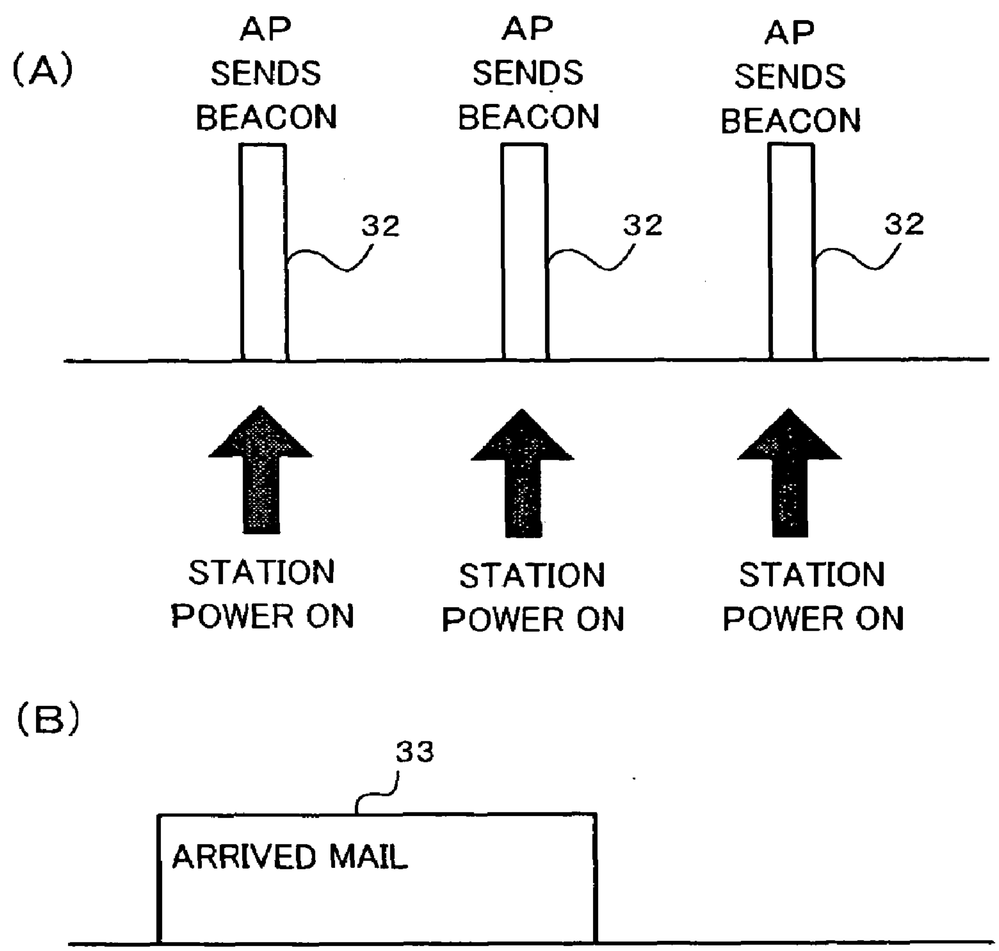
FIGS. 2(A) and 2(B) show beacon signal sent out from the access point and an arrival signal representing as to whether any arrival is present in the host in FIG. 1.

The operation of the wireless LAN system according to the present invention will now be described in greater details. First, the operation of he access point 30 and the wireless LAN device 21 will be described with reference to the timing charts shown in FIGS. 2(A) and 2(B). FIG. 2(A) shows beacon signal 32 sent out from the access point 30, and FIG. 2(B) shows an arrival signal representing as to whether any arrival such as mail 33 or the like is present in the host 20. The beacon signal is sent out as a pulse signal having a predetermined constant cycle, for instance 100 msec.

For the inquiry as to whether any arrived mail 33 or the like is present, the power supply of the wireless LAN device 21, in which the sleep state is now in force for the energy-saving purpose, is turned on in the same cycle as beacon signal 32 from the access point 30. When arrived data (or packet) addressed to the own host (i.e., host 20) is present, the wireless LAN device 21 provides a start request to the host 20 (step A1) When the host 20 is started (step A2), the application for receiving any arrived IP phone is started (step A3), thus rendering the host 20 to a state capable of receiving arrived data 33, i.e., setting up its "reception OK" state (step A4).

Figure 3:
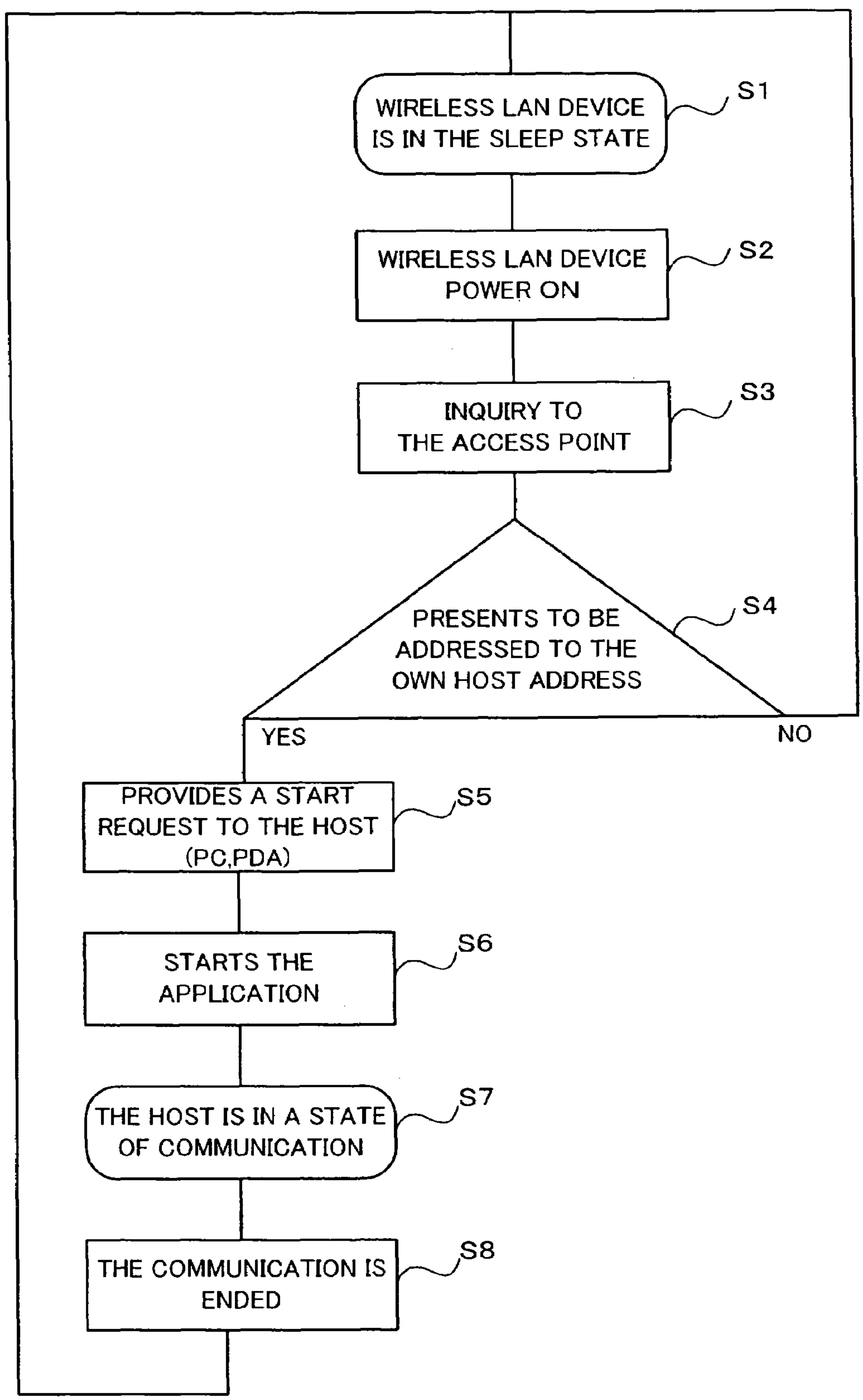
FIG. 3 is a flow chart showing the series of operations of the embodiment of FIG. 1.

FIG. 3 is a flow chart showing the series of operations described above. The wireless LAN device 21 is normally in the sleep state (step S1). By turning on and off the power supply of the wireless LAN device 21 in a predetermined cycle synchronized to the beacon signal 32 noted above (step S2), the wireless LAN device 21 makes inquiry to the access point 30 (step S3). When no data arrival 33 addressed to the own host address is present (step S4, "No"), the routine goes back to the step S1.

When a data arrival 33 addressed to the own host address is present (step S4 "Yes"), the wireless LAN device 21 provides a start request to the host 20 (step S5). The application (i.e., software) is thus started (step S6). Now, the host 20 is in a state of communication with the access point 30 (step S7). When the reception of the arrival 33 is ended, i.e. when the communication is ended (step S8), the routine goes back to the step S1, the above sequence of operations is repeated. The cycle of the beacon signal 32 is set to about 100 msec, and it does not take place that the wireless LAN device 21 ends the reception in its sleep state. Also, since each host 20 is in the sleep state, power consumption is little, and this is particularly effective with a portable host operable with a built-in battery because the operation time thereof is extended.

Figure 4:
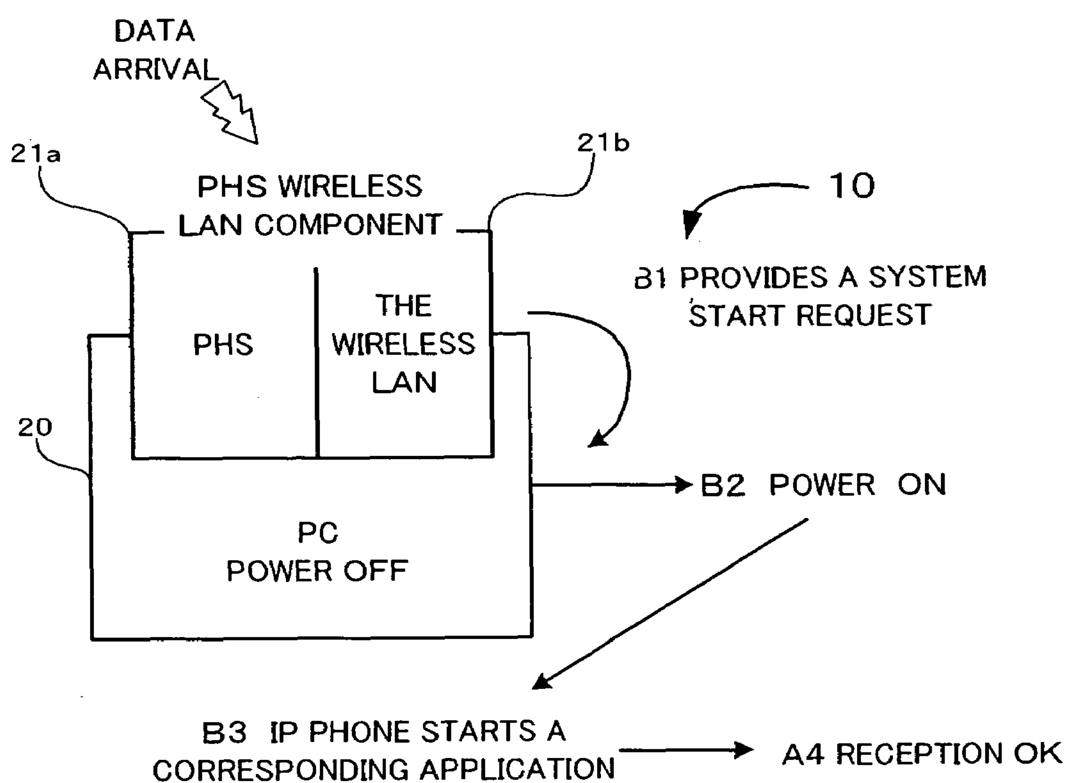
FIG. 4 is a view for describing the main part of a second embodiment of the wireless LAN system according to the present invention.

While the first embodiment has been described in details in connection with its arrangement and operation, a second embodiment of the present invention will now be described in detail with reference to the diagram of FIG. 4. In the second embodiment of the wireless LAN system, a LAN component constituted by a PHS (personal handy phone system) 21*a* and a wireless LAN 21*b*, is used in lieu of the wireless LAN device 21 built in or connected to the host 20 in the first embodiment shown in FIG. 1. The power supply of the PHS 21*a* is held "on" at all times.

The operation of the second embodiment shown in FIG. 4 will now be described. When the data from the access point 30 arrives at the PHS 21*a*, the PHS 21*a* turns on the power supply of the wireless LAN 21*b* of the LAN component (step B1). The wireless LAN 21*b* then requests the system start to the host 20 (step B2). When the host 20 is system started, it automatically starts its built-in arrival application (step B3). The host 20 is thus rendered to a "reception OK" state (step B4), and receives the arrived data 33. When no data arrival is found in a constant time period after the end of the reception, the above sleep mode is set again in the wireless LAN 21*b* and the host 20.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting. For instance, the wireless LAN device may be provided with a built-in timer, and when a predetermined time (which may be set when an arrival is expected at a regular time interval) has passed the power supply of the wireless LAN device is turned on to cause system start request provision to the host so as to start the arrival application for the reception.

As has been made obvious from the foregoing, with the wireless LAN system according to the present invention, the following pronounced practical effects can be expected. That is, it is made possible to receive arrived IP phone or the like even when the power supply of the host with the wireless LAN device mounted therein is "off". Also, the power supply of the station need not be "on" at all times, and it is thus possible to reduce consumed power. This is so because the wireless LAN device is arranged such that it automatically turns on, if necessary, the power supply of the host.

Furthermore, when a host (i.e., terminal) is moved out of the area of the first access point and to the area of another access point, smooth roaming is obtainable because the station power supply is turned on at the beacon signal cycle interval. In the case that the power supply of the wireless LAN device is a built-in battery and held "on" at all times, the wireless LAN device makes a check at all times as to whether any data arrival from the access point (AP) is present, and when a data arrival is present, it turns on the power supply of the host to cause automatic starting the reception application in the host, thus permitting reception of the arrival.

Furthermore, in the energy-saving mode, the power supply is not held "on" at all times, and normally only the reception circuit is held power "on". When the receiving circuit detects the terminal movement, the transmission circuit is rendered to be power "on" for roaming. After completion of the roaming, the transmission circuit becomes power "off". It is possible that at this time the reception circuit always detects data arrivals and, when it detects an arrival, it provides a start request to the host.

What is claimed is:

1. A wireless local area network (LAN) system, comprising:

a plurality of computers that each has a power source and a wireless LAN device, each said LAN device having a source of internal power and an energy-saving mode in which said LAN device is in a sleep state, each said LAN device being adapted to communicate through an access point using an internet protocol (IP);

wherein a first said LAN device is adapted to waken from the sleep state to respond to a beacon signal transmitted from the access point at predetermined time intervals and to determine whether a message addressed to a first one of the computers associated with the first said LAN device is to be received;

wherein the first said LAN device is adapted to turn ON the first computer when the beacon signal indicates that the message is to be received and to return to the sleep state when the beacon message does not indicate that the message is to be received; and wherein the first said LAN device is adapted to use said source of internal power to respond to the beacon signal when the first computer is not ON and to use the power source of the first computer when the first computer is ON.

2. The LAN system of claim 1, wherein the first said LAN device is adapted to return to the sleep state when the power source of the first computer is used to respond to the beacon signal.

* * * * *